US008223027B2

(12) United States Patent
Jenkins et al.

(10) Patent No.: US 8,223,027 B2
(45) Date of Patent: Jul. 17, 2012

(54) WIRELESS TANK MONITORING SYSTEM HAVING SATELLITE COMMUNICATIONS CAPABILITY

(75) Inventors: Patrick A. Jenkins, Knoxville, TN (US); Paul D. Kronau, Knoxville, TN (US); Wojtek Miller, Knoxville, TN (US)

(73) Assignee: Robertshaw Controls Company, Carol Stream, IL (US)

( * ) Notice: Subject to any disclaimer, the term of this patent is extended or adjusted under 35 U.S.C. 154(b) by 2090 days.

(21) Appl. No.: 10/996,804

(22) Filed: Nov. 24, 2004

(65) Prior Publication Data

US 2006/0111040 A1    May 25, 2006

(51) Int. Cl.
*G08B 21/00*    (2006.01)

(52) U.S. Cl. ..... 340/612; 340/506; 340/511; 340/539.1; 340/539.24

(58) Field of Classification Search ............... 340/612, 340/506, 511, 539.1, 539.24, 603, 613, 618; 700/9; 702/188
See application file for complete search history.

(56) References Cited

U.S. PATENT DOCUMENTS

| | | | | |
|---|---|---|---|---|
| 4,671,120 | A * | 6/1987 | Fowler | 73/291 |
| 5,365,520 | A * | 11/1994 | Wang et al. | 370/217 |
| 5,673,252 | A * | 9/1997 | Johnson et al. | 370/449 |
| 6,195,090 | B1 * | 2/2001 | Riggins, III | 725/139 |
| 6,292,095 | B1 * | 9/2001 | Fuller et al. | 340/442 |
| 6,392,692 | B1 * | 5/2002 | Monroe | 348/143 |
| 6,510,350 | B1 * | 1/2003 | Steen et al. | 700/9 |
| 6,662,649 | B1 * | 12/2003 | Knight et al. | 73/290 V |
| 7,020,701 | B1 * | 3/2006 | Gelvin et al. | 709/224 |
| 7,174,783 | B2 * | 2/2007 | McSheffrey et al. | 73/291 |
| 7,228,210 | B2 * | 6/2007 | Davis et al. | 701/29 |
| 7,295,919 | B2 | 11/2007 | Humphrey | |
| 2003/0174070 | A1 * | 9/2003 | Garrod et al. | 340/870.07 |

OTHER PUBLICATIONS

Andronics Global Data Communications, Internet Press Release, BP Selects UtilityEye Tank Monitoring System (Jan. 18, 2002); http://www.andronics.co.uk; Date Last Visited Nov. 9, 2004; two pages.
The UtilityEye System; Internet; www.utilityeye.com; Date Last Visited Nov. 9, 2004; two pages.
The UtilityEye System LPG; Internet; www.utilityeye.com; Date Last Visited Nov. 9, 2004; two pages.
Cybersensor, Inc.; Internet; Inventory Management System (Tanks, Containers, Cylinders, etc.); Technical Brief, Cybersensor Communicator (Models CFU-101-S-A and BM-211-S-A); www.cybersensor.com; Date Last Visited Nov. 9, 2004; three pages.

(Continued)

*Primary Examiner* — Daryl Pope
(74) *Attorney, Agent, or Firm* — Reinhart Boerner Van Deuren P.C.

(57) ABSTRACT

A wireless tank monitoring system for remotely monitoring a plurality of storage tanks is provided. This tank monitoring system utilizes wireless communication from individual tank level monitors to a single SatComm Gateway. The SatComm Gateway then utilizes a low-Earth Orbit satellite constellation to transmit information to a central data collection center. The data collection center then provides access to this information to clients. These clients also have the capability of controlling individual monitors via the bi-directional communications path through the satellite link to the SatComm Gateway to the individual monitors. The SatComm Gateway packages the information from each of the monitors to optimize the communications through the satellite link to decrease the cost of transmission. Intrinsic safety is provided by each of the individual tank level monitors.

27 Claims, 1 Drawing Sheet

OTHER PUBLICATIONS

Centeron, Robertshaw Industrial Products; Internet; Specs WebView; Centeron Wireless Monitoring System; http://wirelessmonitoring.centeron.net; Date Last Visited Nov. 9, 2004; three pages.

Centeron, Robertshaw Industrial Products; Internet; Sensor Technologies; www.wirelessmonitoring.centeron.net; Date Last visited Nov. 9, 2004; two pages.

Centeron, Robertshaw Industrial Products; Internet; Specs PC View; Centeron Wireless Monitoring System; http://wirelessmonitoring.centeron.net; Date Last Visited Nov. 9, 2004; one page.

Centeron, Robertshaw Industrial Products; Internet; Specs Commercial Controller; Centeron Wireless Tank Monitoring System; http://wirelessmonitoring.centeron.net; Date Last Visited Nov. 9, 2004; two pages.

Quake Global Company; Internet Solution Brochure; Total Solution Applications; http://www.quakeglobal.com; Date Last Visited Nov. 9, 2004; one page.

ORBCOMM; Internet; Communicators: ORBCOMM Type Approved Modems—Stellar ST2500 and Stellar ST Lite; ORBCOMM Pending Type Approved Modems—Mobiapps M100; http://www.orbcomm.com; Date Last Visited Nov. 9, 2004; two pages.

ORBCOMM; Internet; Our Technology; Ground Segment: Gateway Control Center (GCC), Network Control Center (NCC), Gateway Earth Station (GES); http://www.orbcomm.com; Date Last Visited Nov. 9, 2004; two pages.

ORBCOMM; Internet; Our Technology; How it Works: Overview; Satellite Communication Frequencies and Data Rates; http://www.orbcomm.com; Date Last Visited Nov. 9, 2004; two pages.

\* cited by examiner

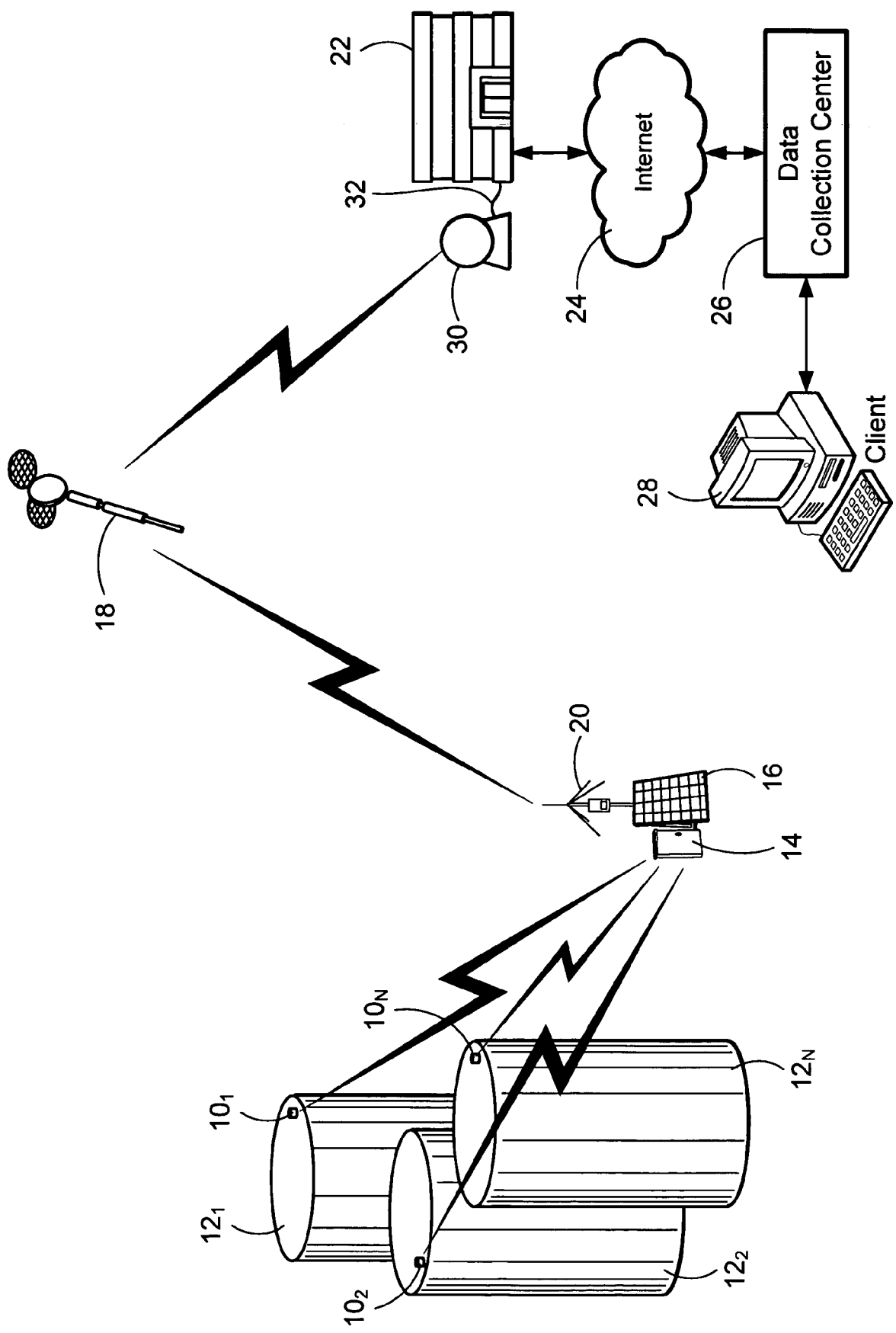

WIRELESS TANK MONITORING SYSTEM HAVING SATELLITE COMMUNICATIONS CAPABILITY

FIELD OF THE INVENTION

The present invention relates generally to tank level monitoring systems, and more particularly to tank level monitoring systems that utilize a satellite link to provide monitored tank level information to remote locations worldwide.

BACKGROUND OF THE INVENTION

Tank level monitoring and timely reporting of information are critically important both economically and environmentally for both consumer and commercial applications. On the consumer side, tank level monitoring, for example, for heating fuel storage tanks ensures that proper deliver of additional heating fuel may be accomplished before the consumer runs out the tank goes empty. In commercial applications, such as a gas station, tank level monitoring is also used to ensure that the gas station does not run out of gas before another delivery of fuel may be accomplished. If such a situation were to occur, this would result in a of loss revenue for the gas station and an inconvenience for consumers. From the ecological stand point, tank level and spill monitors are used to identify leak conditions, that if left unchecked, could result in environmental damage.

In the past both consumers and commercial operators were required to manually check the tank levels, either by reading a gauge or using a dip stick, to determine the level of fuel or other substance in the storage tank. The users would then be required to call for additional fuel or other substance to be delivered to refill the tank under a will-call system. However, if the user were to forget to check the tank or misjudge when a call for re-supply should be made based on their usage, the tank could run empty before a re-supply arrives.

To overcome this problem modern tank level monitoring systems automate the monitoring and reporting of the tank level. This allows distributors to use computerized supply systems to schedule deliveries to prevent their stations or customers from running dry. As an example of such a modernized system, many gas stations utilize tank level monitors to monitor the level of fuel in both of their storage tanks, one for regular and one for premium-(mid-grade being a combination of the two). These tank level monitors are than hard wired to a communication module that reports the tank level information to a distributor's supply computer to automate the scheduling of deliveries of fuel. Such a communication module may provide this information over traditional telephone lines via a modem that dials in to the distributions system computer.

Recently, these systems have begun to us a constellation of low-Earth orbit (LEO) satellite systems to relay such information. Such systems have found favor with large oil companies because as it allows them to collect information from thousands of locations at a central point. This information may then be used not only to schedule fuel deliveries at a local level, but also to measure profitability, usage patterns, etc. for their entire distribution network.

A problem with such a system, however, lies in the use of the hard wired connection between the tank level monitors and the communications module. Because the tank level monitors are monitoring a volatile fuel, safety requirements for the communications wiring leading from the tank level monitors to the communications module requires isolation, grounding, and barrier techniques be used to reduce the risk of propagating an electrical charge to the storage tanks. As may well be imagined, conducting a lighting strike along the communications line to a fuel storage tank is not desirable. Additionally, since the typical gas station only includes two storage tanks, the amount of information needed to be transmitted via the LEO satellite system is relatively small. As such, and even though usage of the LEO satellite system is charged by the bit of information transmitted, these systems simply transmit the data monitored from each tank.

Another system that is currently available for more remotely located, single tank storage instillations provides a tank level monitor and satellite communications module in a single integrated assembly. This stand alone unit provides a single monitor/uplink per storage tank. This integrated assembly periodically checks the tank level and transmits this information on a scheduled basis via the LEO satellite to its remotely located monitoring center.

While such a system is good for single tank remote locations, it becomes prohibitively expensive if multiple tanks at a particular location need to be monitored. This is because each tank level monitor also integrates the satellite communications module that enables it to report its data to the LEO satellite system. Further, if volatile fuels or chemicals need to be monitored, incorporation if the satellite communications module on the tank raises safety concerns that will also drive up the costs of the housing and design to ensure the assembly's intrinsic safety. Additionally, since each tank level monitor transmits its own data via the LEO satellite system, the cost for transmitting the amount of data that would be generated at a storage tank farm is prohibitive.

While each of these systems provides an improvement over the previous requirement that the tank level be manually checked and reported, each introduces cost and safety concerns, particularly for large, remote storage locations having multiple storage tanks for which the tank level needs to be monitored. There exists, therefore, a need in the art for a tank level monitoring system that provides intrinsic safety, cost efficiency, and the ability to report monitored information to and receive commands from remote locations worldwide.

These and other advantages of the invention, as well as additional inventive features, will be apparent from the description of the invention provided herein.

BRIEF SUMMARY OF THE INVENTION

In view of the above, it is an objective of the present invention to provide a new and improved tank level monitoring system that overcomes the above described and other problems existing in the art. More particularly, is an objective of the present invention to provide a new and improved tank level monitoring system that utilizes a satellite link to provide tank level monitored information to remote locations. It is a further object of the present invention to provide such a new and improved tank level monitoring system that utilizes the LEO satellite network to provide tank level monitored information to a central data collection center. It is the further object of the present invention to provide such a system which also provides remote client access to the data stored in the central data collection center for monitoring and control of the remote tank level monitoring system.

It is a further object of the present invention to provide a tank level monitoring system that allows two way communications through the LEO satellite network to both report and control tank level monitoring operation for remote sites. It is a still further object of the present invention to provide wireless communication between individual tank monitors and a centralized satellite communications (SatComm) Gateway that allows scalability of the number of tanks monitored. As such, it is the further object of the present invention to provide packaging of the information monitored by the multiple tank monitors prior to transmitting this information through the satellite network to the central data collection center to reduce overall cost of utilizing this satellite communications link.

In view of these objects, it is a feature of the present invention to utilize a number of individual tank level monitors that communicate with a central SatComm Gateway via wireless communication. Preferably, this wireless communication is in the form a direct sequence spread spectrum radio transmission. The range of such wireless transmission is preferably approximately one mile line of sight, and at least five hundred feet obstructed. The system preferably utilizes the single SatComm Gateway to collect information from a number of individual tank monitors, compress the data for transmission via a satellite transmission link to a central data collection center. Individual clients may then access the tank level monitor information and provide control signals to the individual tank level monitors via a thin client connection to the data collection center. Preferably the single SatComm Gateway is extensible, preferably allowing approximately twenty five individual tank monitors to communicate therewith.

Depending on the installation of the system of the present invention, one embodiment of the SatComm Gateway utilizes a solar power system to provide the operating power for this component of the system. The typical transmission power for the SatComm Gateway is 5 watts. Typical power consumption for the satellite communications at 12 v DC is approximately 100 milliamps to receive information from the satellite, 2 amps to transmit information to the satellite, and less than one milliamp during a sleep mode of operation.

Depending on the type of tank to be monitored, the system of the present invention utilizes an appropriate technology sensor, including radar, ultrasonic, pressure, float, or capacitance monitor. Regardless of the sensor technology utilized, the monitors are intrinsically safe, and utilize wireless communication technology to transmit information and receive commands to and from the SatComm Gateway. Preferably DSSS radio technology is utilized as it is superior to narrow bandwidth radios, allowing data to be transmitted and received in the harshest environments. In a preferred embodiment, the monitors transmit information that may be used in the data collection center to allow the display of tank ID information, content, gallons on hand, gallons to full, time of last monitor report, monitor status, and estimated days to empty and average daily usage. The data collection center also includes the capability to provide alarm set points for each individual tank that is monitored.

In one embodiment of the present invention, a tank level monitoring system for communicating remote tank level information via a satellite communications link to a client comprises a plurality of tank level monitors having wireless communications capability. A satellite communications gateway in wireless communication with the plurality of tank level monitors is also included. This satellite communications gateway is configured to wirelessly receive tank level information from each of the tank level monitors, is programmed to package the tank level information from all of the tank level monitors into a single transmission package, and is configured to transmit the single transmission package to the satellite communications link for delivery to the client.

Each of the plurality of tank level monitors includes a direct sequence spread spectrum (DSSS) radio to provide wireless communication with the satellite communications gateway. Preferably, each of the plurality of tank level monitors includes a DSSS receiver and a DSSS transmitter to enable two way communications with the satellite communication gateway. In such an embodiment, the satellite communications gateway wirelessly may transmit a monitoring interval to each of the plurality of tank level monitors. In one embodiment, the of tank level monitors utilize a UL 50, Type 3 enclosure to facilitate intrinsic safety per UL 913 for use in Class I, Division 1, Group D Hazardous Locations. The plurality of tank level monitors is preferably battery powered.

In one embodiment, the satellite communications gateway is configured to wirelessly transmit commands to the of tank level monitors. Preferably, the satellite communications gateway is configured to wirelessly transmit commands to individual ones of the plurality of tank level monitors. In an embodiment the satellite communications gateway is configured to receive commands from the client via the satellite communications link.

In a preferred embodiment of the present invention, the tank level monitoring system further comprises a data collection center in electronic communication with the satellite communications link. This data collection center receives and processes tank level information monitored by the plurality of tank level monitors. Preferably, the electronic communication is via at least one of a dedicated access line, dial up access, a public switched data network, and email. This data collection center provides electronic access to the received and processed tank level information to the client.

In an alternate embodiment of the present invention, a tank level monitoring system comprises at least one tank level monitor having wireless communications capability, a satellite communications gateway in wireless communication with the at least one tank level monitor, a constellation of low earth orbit (LEO) satellites, a plurality of gateway earth stations (GESs) in communication with the LEO satellites, a gateway control center (GCC) in communication with the plurality of GESs, and a data collection center in communication with the GCC. The satellite communications gateway is configured to wirelessly receive tank level information from the tank level monitor, is programmed to package the tank level information from the tank level monitor into a single transmission package, and is configured to transmit the single transmission package to the satellite communications link for delivery to the data collection center.

In a still further embodiment of the present invention, a method of providing tank level information to a client is provided. This method comprises the steps of monitoring a tank level by a wireless tank level monitor, wirelessly transmitting information regarding the tank level to a satellite communication gateway, packaging the information for transmission to a low earth orbit (LEO) satellite within the satellite communication gateway, transmitting by the satellite communication gateway the information packaged for transmission to the LEO satellite, receiving the information at a data collection center from a ground control center (GCC) that receives the information from gateway earth stations (GES) in communication with the LEO satellite, processing the information, and providing the client access to the information via the data collection center.

Preferably, the step of wirelessly transmitting information comprises the step of transmitting the information via direct sequence spread spectrum (DSSS) transmissions. The method may further comprising the step of wirelessly receiving by the satellite communication gateway information from a plurality of wireless tank level monitors. In such an embodiment the step of packaging the information for transmission to a low earth orbit (LEO) satellite within the satellite communication gateway comprises the step of packaging the information from all of the wireless tank level monitors into a single transmission package.

In yet a further embodiment of the present invention, a method of controlling remote tank level monitors is provided. This method comprises the steps of electronically communicating a command to a ground control center for transmission via a low earth orbit (LEO) satellite, receiving the command at a satellite communication gateway from the LEO satellite, and wirelessly transmitting the command from the satellite communication gateway to the tank level monitors. Preferably, the step of wirelessly transmitting the command comprises the step of transmitting the command via direct sequence spread spectrum (DSSS) transmissions.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1 illustrates a system level perspective of the wireless tank level monitoring system of one embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As discussed above, current tank level monitoring systems do not provide a cost effective solution to monitor large storage tank farms or other installations with multiple storage tanks that are remotely located from where the information regarding these tanks is processed. While the utilization of a satellite communication system has enhanced the ability to deliver tank monitoring information on a global basis, current systems require wired monitors that bring with them enhanced safety requirements and corresponding increased costs. Stand alone, integrated systems are not an effective solution as the satellite communications circuitry must be duplicated for each tank to be monitored. In each of these previous systems, the type of data transmitted through the satellite network would also be cost prohibitive to an installation having several storage tanks. Further, the requirement that the tank mounted equipment be intrinsically safe also prohibitively adds a cost element to these previous systems.

To overcome these problems existing with prior systems, the system of the present invention illustrated in FIG. 1 utilizes wireless communication between an intrinsically safe tank level monitor $10_{1...N}$ deployed on each of the tanks to be monitored $12_{1...N}$ to a single satellite communication (SatComm) Gateway 14. The SatComm Gateway 14 may utilize external power provided at the installation site, or may include its own solar power generator 16 to provide operational power for communication between the SatComm Gateway 14 and the plurality of individual tank monitors $10_{1...N}$, and between the SatComm Gateway 14 and the low Earth orbit (LEO) satellite 18 via antenna 20. The satellite 18 provides the communicated information from the SatComm Gateway 14 to a gateway control center (GCC) 22. The GCC 22, in turn, provides this information via dedicated line or via the internet 24 to a data collection center 26. Individual clients 28 can then access the data stored at the data collection center 26 via dedicated lines or via the internet 24.

The wireless tank monitoring system of the present invention is designed to help companies that monitor tanks have maximum control over product distribution, collection, and overall vessel management. The individual wireless monitors use state of the art radio and sensor technology to remotely monitor storage tanks in a number of applications including petroleum, propane, chemicals, and agriculture. The system of the present invention provides an up to date, accurate account of tank levels that allow a business to plan deliveries more efficiently and monitor conditions at remote storage locations.

The wireless monitors $10_{1...N}$ of the present invention gather tank information and transmit the data to the single SatComm Gateway 14 via a robust wireless data link. Preferably, the monitors utilize a powerful direct sequence spread spectrum (DSSS) radio that is designed for reliable service in the harshest environments. The monitors are battery powered to provide reliable wireless data communication even from underground tanks. Each monitor 10 is intrinsically safe per UL 913 so it may be located in the hazardous area of, for example, propane tanks, etc. For such installations, these monitors preferably have a UL 50 Type 3 enclosure to provide the protection needed in a propane environment. The monitors 10 are preferably gage monitors that magnetically attach to the propane tanks. The propane level is measured using a reliable hull effect sensor that senses float position inside the tank. No tank penetration is needed for installation.

These monitors provide approximately a five year battery life with a four hour transmit interval, comply with FCC part 15, and are intrinsically safe for use in Class I, Division 1, Group D Hazardous Locations. For installations to monitor the tank level of other fuels, lubricants, and chemicals, the monitors 10 may utilize radar, ultrasonic, pressure, float, or capacitance technology depending on the particular type of fluid in the storage tank 12. Each of these monitors provides the same intrinsic safety.

The SatComm Gateway 14 manages the flow of information from each of the individual monitors $10_{1...N}$ to the data center 26 via the LEO satellite network. It compresses the information from each of the individual monitors to optimize data throughput and minimize costs for utilization of the LEO satellite link in the communications channel. The SatComm Gateway 14 reports this information according to a time schedule and/or alarm conditions that a client chooses to suit its need to manage its business more effectively. Because the communication is two-way with the SatComm Gateway 14, a client 28 may set it up through the data collection center 26, and can revise the settings at any time to optimize system performance.

Since the communication from the SatComm Gateway 14 to the individual tank monitors $10_{1...N}$ is wireless, the SatComm Gateway 14 can take in information from a large number of individual monitors. Preferably, the SatComm Gateway 14 can communicate with approximately 25 individual tank level monitors. Because the SatComm Gateway 14 is located remotely from the individual storage tanks $12_{1...n}$, there is no need for the SatComm Gateway 14 to be intrinsically safe. This substantially reduces the cost of the system without any reduction in the safety thereof since the individual monitors $10_{1...N}$ located on the tanks are each intrinsically safe. Indeed, with a radio range of 1 mile line of sight or 500 feet obstructed, there is no danger or reduction in safety presented by the SatComm Gateway 14. This is a significant departure from previous systems that utilized wired links to the individual monitors or that provided satellite communication on individual storage tanks.

While various satellite communication systems may be utilized in the system of the present invention, a preferred embodiment of the present invention utilizes the ORBCOMM system of Global, 2-way data communication services provided by its network of low-Earth orbit (LEO) satellites. In this satellite system the SatComm Gateway 14 transmits information via the LEO satellites 18 to the ORBCOMM gateway control center (GCC) 22. The GCC 22 then route messages to the data collection center 26 over the internet 24, via dedicated delivery lines, etc.

The communication from the SatComm Gateway 14 to the LEO satellites 18 is via VHF communication. The communication link utilizes a packet-switched protocol with full transmission acknowledgement. Messaging traffic flows between the satellites 18 and a GCC 22 through tracking stations called gateway earth stations (GESs) 30 that connect with the satellite 18 as it passes overhead. When a satellite is not connected to a GES 30, it can still support messaging from the SatComm Gateway 14 in a store-and-forward mode. The ORBCOMM system's space segment consists of thirty operational satellites distributed around the globe in a low-Earth orbit constellation, with expansion capability for up to forty-seven satellites in seven orbital planes at an altitude of 825 kilometers (515 miles).

Since there are currently twelve GES facilities 30 on four continents, satellite-GCC connectivity and near-real-time messaging capabilities for users throughout much of the world can easily be maintained. The message traffic passed down to the GES 30 is directed over dedicated lines 32 to the GCC 22 for processing and delivery to the data control center 26. While FIG. 1 illustrates transmission via the internet 24, more secure, dedicated delivery methods are also available. Outbound messaging to the SatComm Gateway 14 from the client 28 follows a reverse transmission path.

In the current ORBCOMM configuration, the satellite uplink frequency is between 148.00 and 150.05 MHz, with a satellite downlink frequency between 137.00 to 138.00 MHz. The subscriber uplink data rate is 2.4 kbps using SDPSK modulation. The subscriber downlink rate is 4.8 kbps also using SDPSK modulation. The Gateway uplink rate however is 57.6 kbps using OQPSK modulation and the Gateway downlink rate is 57.6 kbps also using OQPSK modulation.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tank level monitoring system for communicating remote tank level information via a satellite communications link to a client, comprising:
   a plurality of tank level monitors having wireless communications capability;
   a satellite communications gateway in wireless communication with the plurality of tank level monitors, the satellite communications gateway configured to wirelessly receive tank level information from each of the tank level monitors, programmed to package the tank level information from all of the tank level monitors into a single transmission package, and configured to transmit the single transmission package to the satellite communications link for delivery to the client.

2. The tank level monitoring system of claim 1, wherein each of the plurality of tank level monitors includes a direct sequence spread spectrum (DSSS) radio to provide wireless communication with the satellite communications gateway.

3. The tank level monitoring system of claim 2, wherein each of the plurality of tank level monitors includes a DSSS receiver and a DSSS transmitter to enable two way communications with the satellite communication gateway.

4. The tank level monitoring system of claim 3, wherein the satellite communications gateway wirelessly transmits a monitoring interval to each of the plurality of tank level monitors.

5. The tank level monitoring system of claim 1, wherein the plurality of tank level monitors utilize a UL 50, Type 3 enclosure to facilitate intrinsic safety per UL 913 for use in Class I, Division 1, Group D Hazardous Locations.

6. The tank level monitoring system of claim 1, wherein the plurality of tank level monitors are battery powered.

7. The tank level monitoring system of claim 1, wherein the satellite communications gateway is configured to wirelessly transmit commands to the plurality of tank level monitors.

8. The tank level monitoring system of claim 7, wherein the satellite communications gateway is configured to wirelessly transmit commands to individual ones of the plurality of tank level monitors.

9. The tank level monitoring system of claim 1, wherein the satellite communications gateway is configured to receive commands from the client via the satellite communications link.

10. The tank level monitoring system of claim 1, further comprising a data collection center in electronic communication with the satellite communications link, the data collection center receiving and processing tank level information monitored by the plurality of tank level monitors.

11. The tank level monitoring system of claim 10, wherein the electronic communication is via at least one of a dedicated access line, dial up access, a public switched data network, and email.

12. The tank level monitoring system of claim 10, wherein the data collection center provides electronic access to the received and processed tank level information to the client.

13. The tank level monitoring system of claim 1, wherein the satellite communications link comprises:
   a constellation of low earth orbit (LEO) satellites;
   a plurality of gateway earth stations (GESs) in communication with the LEO satellites;
   a gateway control center (GCC) in communication with the plurality of GESs.

14. The tank level monitoring system of claim 2, wherein the DSSS radio of each of the plurality of tank level monitors has a range of at least 500 feet obstructed.

15. A tank level monitoring system, comprising:
   at least one tank level monitor having wireless communications capability;
   a satellite communications gateway in wireless communication with the at least one tank level monitor;
   a constellation of low earth orbit (LEO) satellites;
   a plurality of gateway earth stations (GESs) in communication with the LEO satellites;
   a gateway control center (GCC) in communication with the plurality of GESs;
   a data collection center in communication with the GCC; and
   wherein the satellite communications gateway is configured to wirelessly receive tank level information from the at least one tank level monitor, programmed to package the tank level information from the at least one tank level monitor into a single transmission package, and configured to transmit the single transmission package to the satellite communications link for delivery to the data collection center.

16. The tank level monitoring system of claim 15, wherein the at least one tank level monitor includes a direct sequence spread spectrum (DSSS) radio to provide wireless communication with the satellite communications gateway.

17. The tank level monitoring system of claim 16, wherein the at least one tank level monitor includes a DSSS receiver and a DSSS transmitter to enable two way communications with the satellite communication gateway.

18. The tank level monitoring system of claim 17, wherein the satellite communications gateway wirelessly transmits a monitoring interval to the at least one tank level monitor.

19. The tank level monitoring system of claim 15, wherein the at least one tank level monitor utilizes a UL 50, Type 3 enclosure to facilitate intrinsic safety per UL 913 for use in Class I, Division 1, Group D Hazardous Locations.

20. The tank level monitoring system of claim 15, wherein the at least one tank level monitor is battery powered.

21. The tank level monitoring system of claim 15, wherein the satellite communications gateway is configured to wirelessly transmit commands to the at least one tank level monitor.

22. The tank level monitoring system of claim 15, wherein the satellite communications gateway is configured to receive commands from the client via the LEO satellites.

23. The tank level monitoring system of claim 15, wherein the data collection center communications with the GCC via at least one of a dedicated access line, dial up access, a public switched data network, and email.

24. A method of providing tank level information to a client, comprising the steps of:
   monitoring a tank level by a wireless tank level monitor;
   wirelessly transmitting information regarding the tank level to a satellite communication gateway;
   packaging the information for transmission to a low earth orbit (LEO) satellite within the satellite communication gateway into a single package;
   transmitting by the satellite communication gateway the single package of information packaged for transmission to the LEO satellite;
   receiving the single package of information at a data collection center from a ground control center (GCC) that receives the single package of information from gateway earth stations (GES) in communication with the LEO satellite;
   processing the information; and
   providing the client access to the information via the data collection center.

25. The method of claim 24, wherein the step of wirelessly transmitting information comprises the step of transmitting the information via direct sequence spread spectrum (DSSS) transmissions.

26. The method of claim 24, further comprising the step of wirelessly receiving by the satellite communication gateway information from a plurality of wireless tank level monitors, and wherein the step of packaging the information for transmission to a low earth orbit (LEO) satellite within the satellite communication gateway comprises the step of packaging the information from all of the wireless tank level monitors into a single transmission package.

27. A method of controlling remote tank level monitors, comprising the steps of:
   electronically communicating a command to a ground control center for transmission via a low earth orbit (LEO) satellite;
   receiving the command at a satellite communication gateway from the LEO satellite;
   wirelessly transmitting the command from the satellite communication gateway to the tank level monitors; and
   wherein the step of wirelessly transmitting the command comprises the step of transmitting the command via direct sequence spread spectrum (DSSS) transmissions.

* * * * *